US005738476A

United States Patent [19]
Assimakopoulos

[11] Patent Number: 5,738,476
[45] Date of Patent: Apr. 14, 1998

[54] FASTENER

[75] Inventor: Angelo Assimakopoulos, Bridgeview, Ill.

[73] Assignee: MacLean-Fogg Company, Mundelein, Ill.

[21] Appl. No.: 749,064

[22] Filed: Nov. 14, 1996

Related U.S. Application Data

[63] Continuation of Ser. No. 448,775, May 24, 1995, abandoned.

[51] Int. Cl.[6] .................................................. F16B 19/00
[52] U.S. Cl. ........................... 411/508; 411/913; 411/182
[58] Field of Search .................................. 411/509, 510, 411/508, 182, 913

[56] References Cited

U.S. PATENT DOCUMENTS

| 3,372,960 | 3/1968 | Fisher | 411/570 |
|---|---|---|---|
| 4,011,770 | 3/1977 | Webb | 411/508 |
| 4,240,323 | 12/1980 | Kojima | 411/182 |
| 4,431,355 | 2/1984 | Junemann | 411/508 |
| 4,579,492 | 4/1986 | Kazino et al. | 411/182 |
| 4,906,152 | 3/1990 | Kurihara | 411/182 |
| 4,971,500 | 11/1990 | Benoit et al. | 411/508 |
| 5,193,961 | 3/1993 | Hoyle et al. | 411/508 |
| 5,294,225 | 3/1994 | Kazino et al. | 411/508 |
| 5,346,347 | 9/1994 | Barikosky et al. | 411/182 |
| 5,429,467 | 7/1995 | Gugle et al. | 411/508 |

FOREIGN PATENT DOCUMENTS

| A090471 | 11/1967 | France | 411/508 |
|---|---|---|---|
| 2477242 | 9/1981 | France | 411/182 |
| 2929461 | 1/1981 | Germany | 411/508 |

*Primary Examiner*—Darnell M. Boucher
*Attorney, Agent, or Firm*—Richard G. Lione; Brinks Hofer Gilson & Lione

[57] ABSTRACT

A plastic fastener for securing moldings to frames in vehicles. The fastener includes minor slots formed in the fastener and adjacent to a coupling structure. The minor slots provide sufficient flexibility to allow the fastener to flex inward under pressure, thereby permitting the coupling structure to move between an engagement position and a retracted position. The fastener is pushed through an opening in the frame. The opening is sized such that the edges of the opening apply pressure to the fastener as it moves through the opening, thereby moving the coupling structure toward its retracted position. When the fastener completely in the opening, the pressure is relieved, and the coupling structure snaps back to its engagement position, thereby engaging the edges of the opening and securing the fastener thereto. The fastener may be removed from the opening by applying sufficient pressure to again move the coupling structure to its retracted position. The minor slots give the fastener the flexibility to permit its coupling structure to move back and forth between its retracted and engagement positions with a reduced likelihood of breakage.

9 Claims, 3 Drawing Sheets

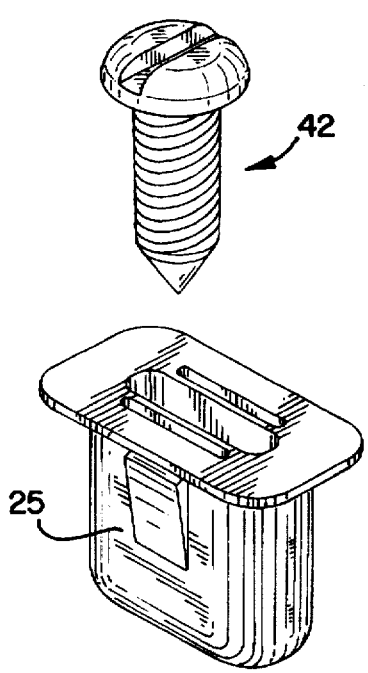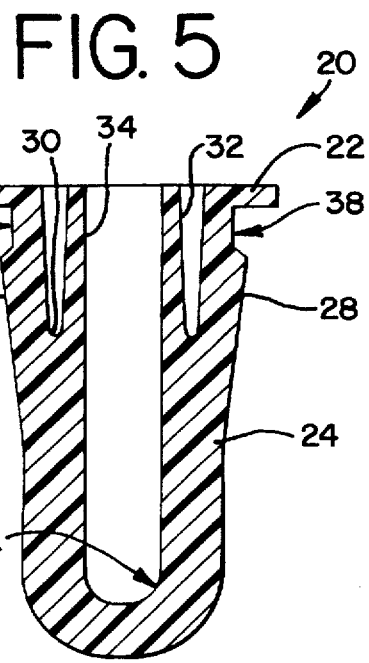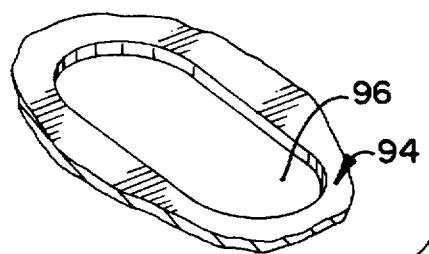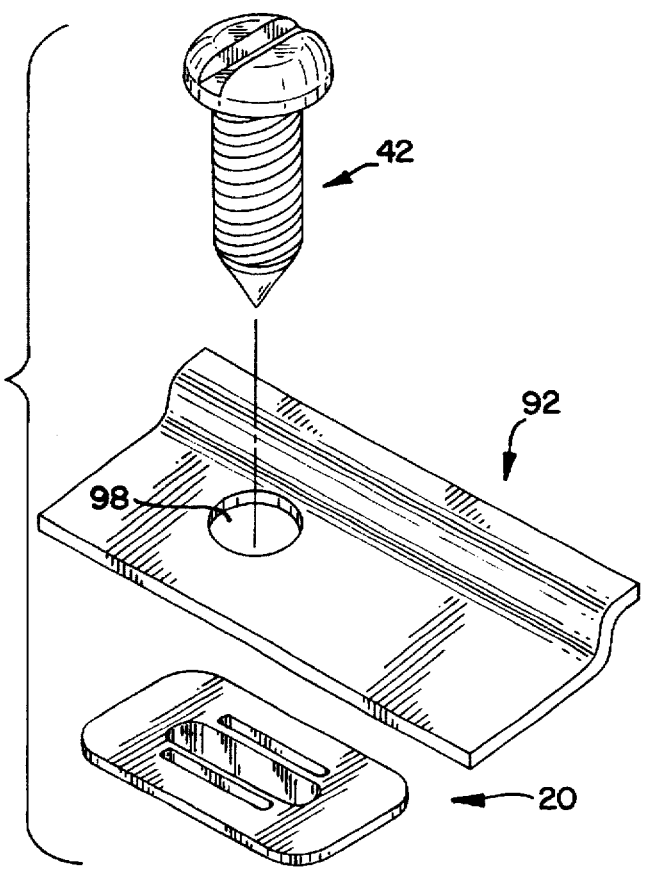

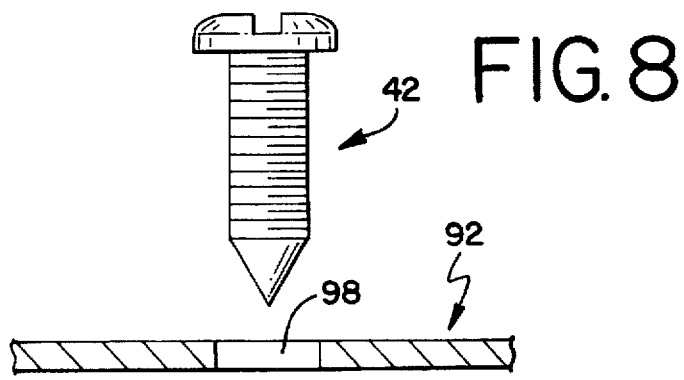
FIG. 8
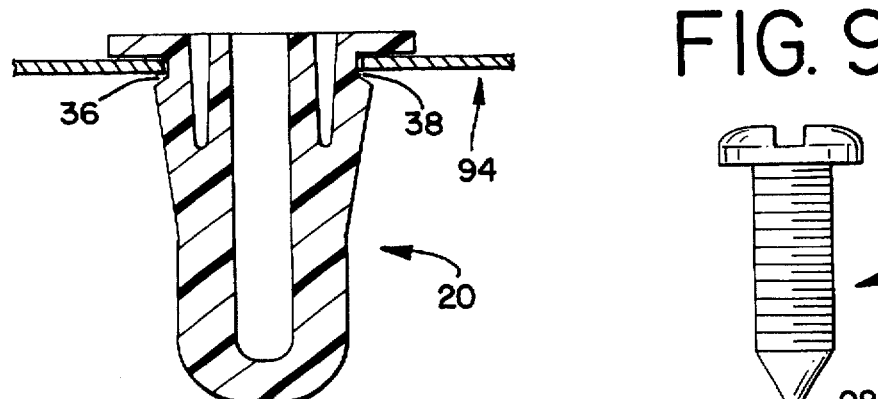
FIG. 9
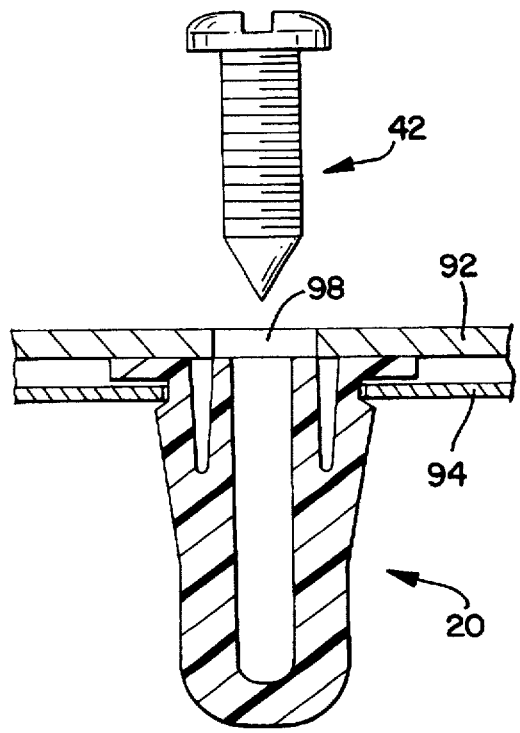
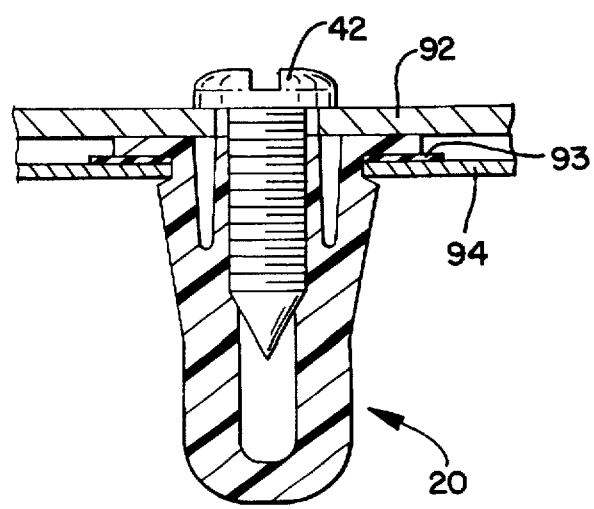
FIG. 10

5,738,476

1

FASTENER

This application is a continuation of application Ser. No. 08/448,775, filed May 24, 1995 now abandoned.

BACKGROUND OF THE INVENTION

Plastic fasteners have been used to secure moldings to the frame sections of automobiles. Such fasteners should be easy to install, and provide a sealant barrier between outside elements and the internal areas of the metal frame. The plastic fastener is first secured to the frame, then screws are used to fasten the molding to the fastener. The fasteners should also be readily removed without shattering or cracking because shattered parts can cause noise inside the sheet metal frame if not removed.

Thus, it would be beneficial to provide a simple, stable, and easily installed fastener for use in securing together two or more components such as the molding and frame of a vehicle.

SUMMARY OF THE INVENTION

The present invention provides a fastener, preferably made from a sturdy yet pliable plastic material. The fastener may be used to secure a molding to the frame of a vehicle. The fastener includes a body having a coupling structure. The coupling structure has a retracted position and an engagement position, and is capable of securely engaging the frame when in the engagement position. Pressure relief slots are formed in the body and adjacent to at least a portion of the coupling structure. The pressure relief slots allow at least a portion of the body to flex under pressure applied to the coupling structure, thereby allowing the coupling structure to move between its retracted position and its engagement position.

In the preferred embodiment of the present invention, the coupling structure includes protrusions formed on and extending from the sides of the fastener body. Preferably, the protrusions are attached to said fastener body along at least a majority of the length of said protrusions.

The fastener of the above-described invention is secured to the frame by inserting the body portion of the fastener into an opening in the frame. The opening is sized such that an edge of the opening contacts and applies the above-described pressure to the protrusions of the body as the fastener is moved through the opening, thereby moving the coupling structure from its engagement position to its retracted position.

The invention itself, together with further objects and attendant advantages, will best be understood by reference to the following detailed description, taken in conjunction with the accompanying drawings.

BRIEF DESCRIPTION OF THE DRAWINGS

FIG. 5 is a cross sectional view taken along line 5—5 of the fastener shown in FIG. 1.

FIG. 6 illustrates the fastener of FIG. 1, an attachment screw, and an opening in the metal frame of a vehicle.

FIG. 7 illustrates the fastener of FIGS. 1 and 6 inserted into the metal frame opening of FIG. 6, a panel having its opening aligned over the major slot of the fastener, and a screw aligned over the panel opening and major slot.

FIG. 8 is a partial cross sectional view of the screw, molding, fastener and frame shown in FIG. 7.

FIG. 9 is a partial cross sectional view of the screw, molding, fastener and frame shown in FIGS. 7 and 8 wherein said molding has been placed over said fastener.

FIG. 10 is a partial cross sectional view of the screw, molding, fastener, and frame shown in FIGS. 7, 8, and 9, wherein said screw has been inserted through the molding opening and threaded into the major slot of the fastener.

DETAILED DESCRIPTION OF THE DRAWINGS

The present invention is a fastener for securing two sections of material together. Preferably, the fastener is made from a strong yet pliable material such as a plastic. Preferably, the two sections of material include the molding and frame of a vehicle. An opening is formed through the frame, and the fastener is inserted through the opening. A coupling structure is formed on the fastener and is capable of engaging an edge of the opening when the fastener is completely inserted therethrough. The coupling structure includes protrusions extending from the fastener's body and attached to the body along a majority of a length of the protrusions. Minor slots are formed in the body adjacent to the protrusions to allow at least a portion of the body to flex under pressure applied to the body at the protrusions, thereby allowing the applied pressure to move the coupling structure between a retracted position and an engagement position. The opening is sized such that an edge of the opening contacts and applies pressure to the protrusions of the body as the fastener is moved through the opening.

Figure 1:
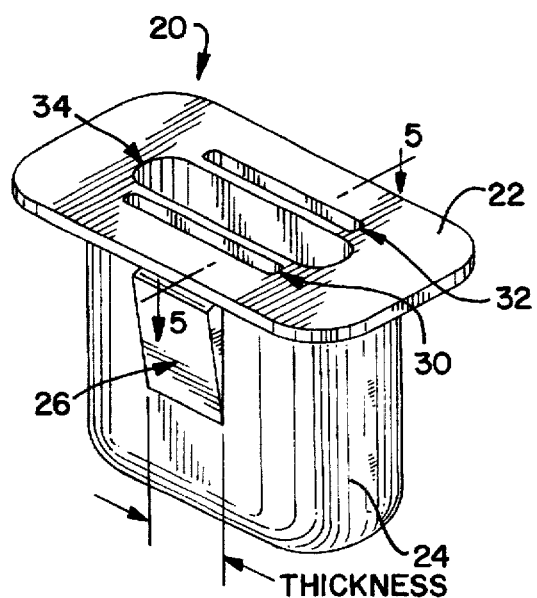
FIG. 1 is an elevated perspective view of a fastener embodying the present invention.
Figure 2:
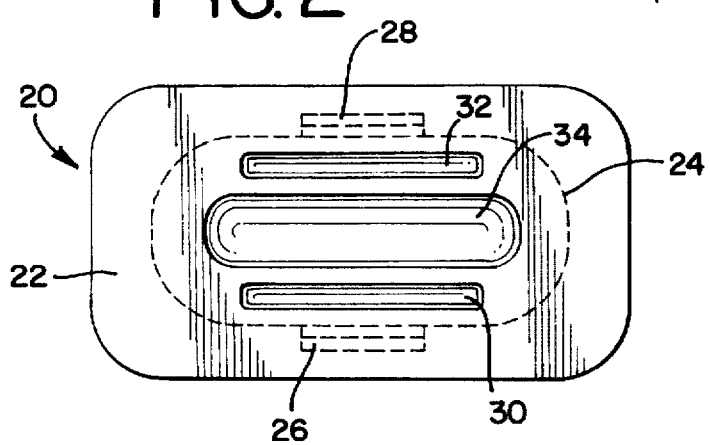
FIG. 2 is a top view of the fastener shown in FIG. 1.
Figure 3:
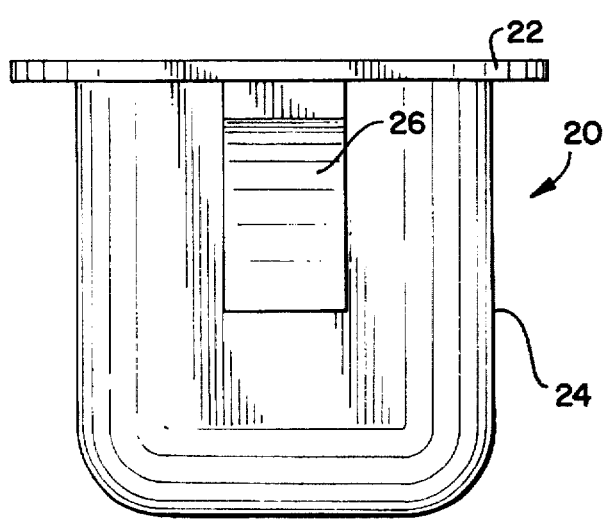
FIG. 3 is a front view of the fastener shown in FIG. 1.
Figure 4:
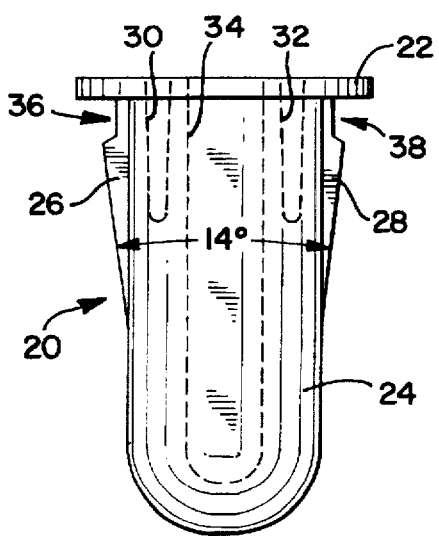
FIG. 4 is a side view of the fastener shown in FIG. 1.

FIGS. 1–5 illustrates a fastener 20, preferably made from plastic, embodying the present invention. As shown, the fastener 20 includes a flange portion 22 and a body portion 24. The body 24 is substantially rectangular in cross-section along its length so that its sides 25 are relatively wide and lie substantially parallel to each other. Two wedge-shaped protrusions 26, 28 are formed on opposite sides of the body 24 and extend away from the body 24. They define a coupling structure. A major slot 34 and two minor slots 30, 32 extend through the flange 22 and into the body 24 of the fastener 20. The major slot 34 has no openings except where it opens through the flanged end of the body (portion) 24 to form a fastener access hole, i.e., the slot 24 forms a closed passage from an open end through the body to a closed end. In the embodiment illustrated, the minor slots are formed in the same way. The major slot 34 is, like the body 24, substantially rectangular in cross-section so that opposed interior walls are relatively wide and substantially parallel to each other along the length of the passage formed by the slot from its open end to the closed end. The protrusions 26, 28 are attached to the body 24 along their entire length. The protrusions 26, 28 have predetermined "thickness" dimensions extending transversely of the sides of the body 24, as seen in FIG. 1. These "thickness" dimensions are smaller than the corresponding width dimensions of the minor slots 30 and 32, as illustrated. In other words, in the illustrated embodiment of the invention the protrusions are substantially narrower than the slots (see FIG. 2 for comparison). In ram, the corresponding width dimension of the major slot 34 is greater than that of the minor slots.

FIGS. 6–10 illustrate how the fastener 20 may be used to attach a molding 92 to a frame 94 of an automobile. As shown, the fastener 20 is first inserted into an opening 96 in the frame 92. The opening 96 is sized such that the edge of the opening 96 contacts and applies pressure to the body 24 as the fastener 20 is advanced through the opening 96. The minor slots 30, 32 give the plastic relief so that the body 24 can flex inward toward a retracted position in response to pressure applied to the body 24 along the protrusions 26, 28. The body 24 and protrusions 26, 28 continue to flex inward until the edges of the opening 96 clear the protrusions 26, 28, thereby removing pressure from protrusions 26, 28 and allowing them to snap back to an engagement position. In the engagement position, the edges of the opening 96 are secured in the groove areas 36, 38 between the flange 22 and the protrusions 26, 28. A gasket 93 may be provided between the flange 22 and the frame 94 to provide a sealant barrier between outside elements and the internal areas of the metal frame 94.

When the fastener 20 is completely inserted in the opening 96, the flange 22 covers the opening 96 and rests against the frame 94. The molding 92 is then placed over the major slot 34 of the fastener 20 such that a circular aperture 98 in the molding 92 is aligned with the major slot 34. A screw 42 is then inserted through the aperture 98 and threaded into the major slot 34 to secure the molding 92 to the flange 22 of the fastener 20, thereby securing the molding 92 and frame 94 together.

The pressure required to move the coupling structure to its retracted position, along with the retaining performance of the fastener 20 when the coupling structure is in its engagement position, is related to the width of the minor slots 30, 32 and the thickness of the protrusions 26, 28. The installation force increases as the widths of the minor slots decrease. Installation force also increases when the thickness of the protrusions 26, 28 increases. The combination of these two parameters can be manipulated to obtain the desired installation force. A procedure known as "Finite Element Analysis" may be used to determine the dimensions required for achieving the desired installation forces, along with other dimensions of the fastener for achieving the desired stress distributions throughout the device to prevent breakage. A commercially available software package for performing Finite Element Analysis is sold under the tradename "COSMOS" and available from the SRAC company of California.

As an alternative, the minor slots 30, 32 can provide significantly reduced installation force by being detached from the flange 22 in a desired area, for example providing space between the outer edge of each minor slot 30, 32 and the flange 22. This would allow slots 30, 32 to collapse rather easily, thereby even further reducing the force required to flex the body 24 inward.

Additionally, the minor slots 30, 32 provide strain relief for the major slot 34 as the screw 42 is threaded in and out of the major slot 34, thereby reducing the likelihood that the fastener 20 will shatter after repeated insertion and removal of the screw 42.

Preferably, the gasket is made from a neoprene-type foam rubber. The fastener 20 is preferably a nylon such as Zytel grade 103 available from DuPont, or Vydyne grade 22 available from Monsanto.

Of course, it should be understood that a wide range of changes and modifications can be made to the preferred embodiment described above. It is therefore intended that the foregoing detailed description be regarded as illustrative rather than limiting and that it be understood that it is the following claims, including all equivalents, which are intended to define the scope of this invention.

What is claimed is:

1. A fastener for securing a molding or the like to the frame of a vehicle or the like, comprising:
   a) an elongated fastener body made of sturdy but pliable plastic material;
   b) a flange formed unitarily with, and encircling one end of, said body, said body being elongated in a direction away from said flange;
   c) a major slot for receiving a connector formed into said body from said one end of said body, said slot extending from an open end at said one end of said body through a major portion of the length of said body and forming a closed passage from said open end to a closed end;
   d) two minor slots formed in said body from said one end of said body and extending through a portion of the length of said body, said major slot being disposed between said minor slots; and
   e) a coupling structure including an elongated, wedge-shaped protrusion formed on each of two opposite sides of said body, bracketing said minor slots;
   f) each of said elongated, wedge-shaped protrusions being attached to said body along at least a substantial portion of its length, the length of each wedge-shaped protrusion being greater than the length of the corresponding minor slot and each wedge-shaped protrusion being narrower than the width of the corresponding minor slot.

2. The fastener of claim 1 further characterized in that:
   g) each of said minor slots extends through a minor portion of the length of said body.

3. The fastener of claim 1 further characterized in that:
   h) each of said elongated, wedge-shaped protrusions is attached to said body along its entire length.

4. A fastener for securing a molding or the like to the frame of a vehicle or the like, comprising:
   a) an elongated fastener body;
   b) a flange formed unitarily with said body at one end of said body;
   c) said body being elongated in a direction away from said flange and generally rectangular in cross-section whereby the body has two opposite sides which are relatively wide and disposed substantially parallel to each other along the length of the body;
   d) a major slot for receiving a threaded connector screw formed into said body from said one end of said body, said slot extending from an open end at said one end of said body through a major portion of the length of said body and forming a closed passage from said open end to a closed end, said major slot being accessible only through said open end and including opposed interior walls which are relatively wide and disposed substantially parallel to each other along the length of the slot passage;
   e) two minor slots formed in said body and accesseible only from the flange of said body and extending through a predetermined portion of the length of said body, said minor slots extending substantially parallel to each other and to said major slot which is disposed between them;
   f) a coupling structure including an elongated, wedge-shaped protrusion formed on each of said two opposite sides of said body, bracketing said minor slots and extending along the length of the body away from the flange a distance greater than the distance of the minor slots;

g) each of said elongated, wedge-shaped protrusions being attached to said body along a substantial portion of the protrusion's length, and being narrower than the width of the corresponding minor slot.

5. The fastener of claim 4 further characterized in that:

h) each of said wedge-shaped protrusions extends along a major portion of the body length.

6. A fastener and mounting component assembly, comprising:

a) a molded plastic fastener having an elongated fastener body and a flange formed around one end of said body;

b) a mounting component including a sheet member having an opening formed therethrough;

c) said fastener body extending through said opening whereby said flange is supported by said sheet member;

d) said fastener body having a major slot for receiving a connector formed into said body from said one end of said body, said slot extending from an open end at said one end of said body through a major portion of the length of said body and forming a closed passage from said open end to a closed end, said major slot being accessible only through said open end;

e) two minor slots formed in said body from said one end of said body and extending through a portion of the length of said body, said major slot being disposed between said minor slots;

f) a coupling structure including an elongated, wedge-shaped protrusion formed on each of two opposite sides of said body, bracketing said minor slots;

g) each of said elongated, wedge-shaped protrusions being attached to said body along a substantial portion of its length, each wedge-shaped protrusion being narrower than the width of the corresponding minor slot and extending along the body away from the flange a distance greater than the distance of the minor slots.

7. The assembly of claim 6 further characterized in that:

h) each of said minor slots is formed into said body from an open end at said one end of said body and extends through a portion of the length of said body to a closed end, each of said minor slots being accessible only through a corresponding open end of the minor slot.

8. The assembly of claim 6 further characterized by and including:

j) a sealing element between said flange and said sheet material around said opening, whereby the closed end configuration of the major and minor slots and the operation of the sealing element are effective to prevent moisture from passing through said opening.

9. The assembly of claim 6 further characterized by and including:

h) a connector comprising a screw extending through said opening and threaded into the plastic fastener body in said major slot.

* * * * *

UNITED STATES PATENT AND TRADEMARK OFFICE
CERTIFICATE OF CORRECTION

PATENT NO. : 5,738,476
DATED : April 14, 1998
INVENTOR(S) : Angelo Assimakopoulos It is certified that error appears in the above-identified patent and that said Letters Patent is hereby corrected as shown below:

On the Title Page

In column 2, line 11, under "ABSTRACT", after "fastener" insert --is--.

In the Claims

In claim 4, line 21, change "acceseible" to --accessible--.

In claim 8, line 1, change "6" to --7--.

In claim 8, line 3, change "j)" to --i)--.

Signed and Sealed this

Eleventh Day of July, 2000

Attest:

Q. TODD DICKINSON

*Attesting Officer*   *Director of Patents and Trademarks*